Figure 1:
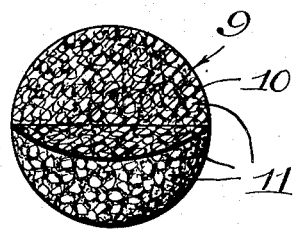

May 17, 1938.  L. H. JONES  2,117,808

ARTICLE FOR PLANT NUTRITION

Filed June 27, 1935

GRANULES
FILLER OF PLASTER BASE

Inventor,
Linus H. Jones
By W. Bartlett Jones, Atty.

Witness:
Chas. R. Konish

Patented May 17, 1938

2,117,808

UNITED STATES PATENT OFFICE 2,117,808

ARTICLE FOR PLANT NUTRITION

Linus H. Jones, Amherst, Mass., assignor to W. Bartlett Jones, Chicago, Ill.

Application June 27, 1935, Serial No. 28,760

2 Claims. (Cl. 71—16)

The present invention relates generally to plant nutrition, and in particular to fertilizing units to be used on the soil or buried as such in the soil. It has special reference to the nutrition of plants in pots or containers where the plants are grown indoors, as in homes and in greenhouses, but its utility is not limited thereto. The invention relates to both the character of the fertilizer and to its form.

There are many fertilizers available and these are generally chemical compounds, (usually soluble salts), and putrescible organic nitrogenous compounds. The chemical salts are quickly available and are potent. The putrescible substances become slowly available by their decomposition which takes place in or on the soil. For quick results, soluble chemicals are employed. However, the soluble fertilizers increase the dangers of fertilizer injury.

In the growth of plants there are important stages pertinent to the present invention. After the germination stage, a plant enters the vegetative stage and then the blossoming stage. Most potted plants are desired and grown for a blossoming stage, but they must have had a proper vegetative period in which to initiate flower-bud differentiation. "Initiating flower bud differentiation" is a process whereby certain cells take on a new habit of activity and arrange themselves so that they will eventually develop reproduction organs. Thus an apple tree differentiates in June and July to form a flower bud that will complete its final development in the following May.

It is not generally known by the layman that a plant may be shifted from the blossoming to the vegetative stage by control of the character of fertilizer. The feeding of soluble salts or chemical fertilizers to a plant in sufficient quantity actually does this. Many of the plant foods today on the market for household use are efficient in quickly producing new growth in potted plants, and hence they are hailed as successful foods. The applicant has made many comparisons of such fertilizers and has determined that many are improper ones for the purpose of securing a healthy blossoming plant with luxuriant growth. Those fertilizers which are wholly or largely chemical salts or inorganic compounds to provide nitrogen, potash and phosphorus, are so quickly taken up that they throw the plant into the vegetative stage and keep it from entering the blossoming stage. The luxuriant growth which is so quickly obtained has little to sustain it after the fertilizer is exhausted. Continued feeding is then necessary, and this keeps the plant out of the blossoming stage. Cessation of feeding it causes the growth to take all the available nourishment and there is not enough to induce blossoms. The plant usually dies down in case the feeding of the chemical salts is stopped.

As a consequence the applicant has proven that the insoluble putrescible types of fertilizer are the proper ones to use, in whole or in substantial part more particularly where nitrogen is concerned. Materials such as manure, sewage sludge, fish meal, slaughter house waste, etc., which are of putrescible organic nitrogenous matter, are suitable for keeping a plant out of the vegetative stage and in the blossoming stage with a luxuriant growth in the blossoming stage. Of course, use of such fertilizers is not new, and these have been used heretofore, both out-of-doors and in-doors, in extensive fields, or beds, or in pots or other containers. Use of such materials in-doors is attended with bad odors. Hence they have not met with success in such fields. The odor comes from the spilling of some of the putrescible material on the surface of the soil, where it begins to decay. If it is dry, the putrescible material may have little odor, but on being subjected to moisture and exposed, the bad odors of decomposition arise, and fertilizer value is lost into the atmosphere to a considerable extent.

The purpose of the present invention is to provide such putrescible materials in a form to facilitate their use in such a way as to avoid stenches and bad odors. Such odors do not mix well with the perfumes of blossoming plants.

The foregoing shows that the putrescible type of fertilizer is necessary as a plant food to produce blossoms, which may be sweet smelling. The objective of perfume from blossoms on a plant may be defeated by the very means necessary to attain it, as it has been utilized heretofore. The object of the present invention then is to convert such putrescible material from bulk form into a pill form, then to bury the pill in the soil about the plant, thus eliminating all danger of spilling any of the material.

Fish meal is an available form of putrescible organic nitrogenous material having a high content of nitrogen and phosphates. Fish meal secured from the cod family after fish waste is extracted for removal of glue-forming substance, has proven an excellent fertilizer. It has an ammonia content of about 10%, and a bone content (phosphate-source) of about 30%. It is not high in potash, but I have found that the addition of chemical forms of potash, such as 10% by weight of potassium carbonate or even of potassium nitrate, does not alter the property of the resulting fertilizer mixture to create and maintain the blossoming stage, on a rational feeding schedule.

The dry or moist putrescible material in granular form is simply compressed into pills by ordinary pill-forming machines. Where rods are desired, it may be extruded as such. If the material does not adhere well in a pill, some adhesive is used. Glue, gelatin, starch, gum, or like water soluble adhesives may be used. These are very suitable where there is no soluble chemical salt present which might interfere with adhesive action, or later lead to accumulation of moisture and destruction of the adhesive. For example, where potassium nitrate is present, and a gelatin adhesive is used, there may in time be some alteration in the pill form, if the same is exposed to moisture. The adhesive may be one which is not water soluble. Some alcohol soluble gum may be used. Other materials soluble in non-aqueous solvents may also be used. For example, a viscous solution of nitrocellulose in amyl alcohol, or other solvent may be used to moisten the granules just prior to compression, and then the solvent may dry out after compression. Only a very thin coat, or even spotting is necessary. Where fish meal and a soluble chemical addition thereto are so used, the non-aqueous type of adhesive is preferred. However, the pill-forming art provides much available knowledge of adhesives and the variations therein for the kind of material to be compressed. Where fish meal is pilled at its source, and is secured as a residue from the glue extracting process, some glue-substance may be left unextracted and used to pill the fish meal.

The same operations may be used on other putrescible material, such as animal or poultry manure, sewage waste, slaughter-house waste, tankage and like substances. All of the material is preferably first thoroughly dried, so that it may be shrunken, and so that it may be comminuted, well mixed, and screened if desired. Then the surfaces of the dry granules are moistened with a thickened adhesive, which penetrates less than a more liquid adhesive. From this a solid rod or pill is formed which is not subject to serious shrinkage after formation, and which is compact and concentrated in food value.

The present invention does not contemplate that all of the surfaces of the granules be covered with adhesive. Only sufficient is necessary to hold the pill together. The interior granules may be absolutely devoid of adhesive. Where large pills or forms are compressed, there may be formed first a shell, as in two halves, which may be filled with dry granulues, either loose or compressed, and then the shells may be placed together with suitable adhesive. The shell portions may be formed and considered generically as a pill, in a pressure mould, using as filler adhesive moistened granules of the same or equivalent material. Forms of large size are useful in nourishing large plants or small trees, either indoors or out-of-doors, in plant containers or in plant nurseries.

In any use of the pills, the preferred method of application is to make a hole in the soil, as with a dibble, dropping in the pill, and covering the same with soil from the rim of the hole.

The substantially rigid form also has additional value apart from the avoidance of stenches when the same is buried in the soil. Therefore, the invention contemplates forms adapted not to be buried, or to be only partially buried. Where decomposition is allowed to take place on the surface of the soil, some nitrogen value may be lost in odors. The advantage is in labor-saving in application, and a balance in cost of labor and cost of fertilizer may be considered in this usage of the rigid forms.

In large commercial greenhouses, and even in out-of-door nurseries, the odor of decomposing fertilizers from the surface of the soil is not objectionable to the management. One common method of fertilizing plants being raised in pots for marketing later, is to have laborers apply a scoopful of bulk fertilizer to the top soil. For example, where bulk material has been so used, it has taken two men six hours to feed 3500 plants with one scoopful per pot. By using a flat-disk or pill, which is thin and large in area, the time may be greatly cut down, for example, to two hours. A flat disk may be placed flat on the soil and from there it will be disintegrated. Or a flat disk may be pushed edgewise into the soil, in whole or in part. Any projecting part will soon fall over and be flat, to spread itself over a bigger area than a more rounded form of pill would occupy. A large round flat disk can readily be pushed into the soil so as to be completely buried. This form is particularly advantageous from the labor-saving point of view; and this is a cost-item of considerable importance. A laborer need only carry a supply of disks in his hand and move quickly from plant to plant. The measuring is previously accomplished in the making of the pill.

In the accompanying drawing there are shown several forms herein referred to, and others which may advantageously be used.

Figure 2:
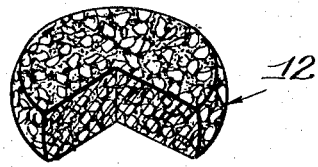
Figure 3:
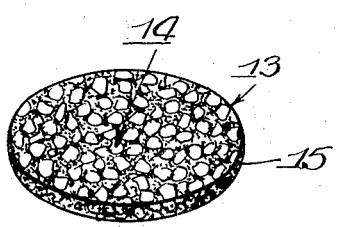
Figure 4:
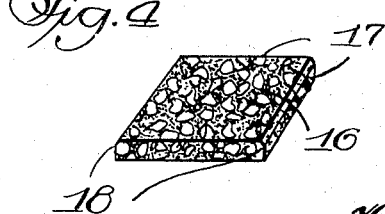
Figure 5:
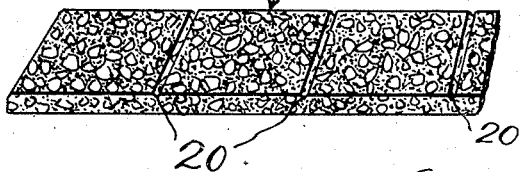
Figure 6:
Figure 7:
Figures 8, 9:
Figure 10:
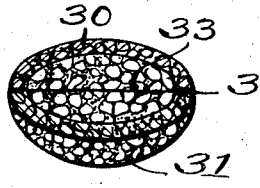
Figure 11:
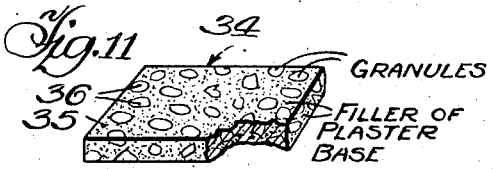

Fig. 1 represents a spherical pill.
Fig. 2 represents a flatter round pellet.
Fig. 3 represents a thin disk of large area.
Fig. 4 represents a flat rectangular form.
Fig. 5 represents a flat strip which may be broken up into forms like that of Fig. 4.
Fig. 6 represents a rod form and also a substantially tapered end.
Fig. 7 is a cross section of the rod form of Fig. 6.
Fig. 8 is a tubular form with truncated end.
Fig. 9 represents an elongated tubular form which may be cut up into the forms of Fig. 8.
Fig. 10 is a form made of pill-like shells with filler within united shells.
Fig. 11 represents a form moulded in a sort of plaster base wherefrom the lime is also of value.

In the drawing the granules may be uniform or different, coarse or fine, and some may be the particles of soluble salt referred to. No differentiation is made in reference to the figures.

In mixing materials the desired chemical salt or salts may be mixed with the substantially dry granules of decomposable substance, and the mixture be compressed, after suitably moistening, if this is necessary. Another way is to make a solution of the salt and impregnate the granules, then wholly or partially dry the same, and pill, using adhesive if necessary. Thus the salt substance may be placed largely inside the granules to minimize the presence of individual chemical salt particles.

The round pill 9 of Fig. 1 is especially adaptable to insertion into a gun or mechanism (not shown) for inserting it onto or below the soil. It is also suitable to be dropped by hand or by a gun, into a hole made by a pencil or dibble. In Fig. 1, the numeral 10 indicates adhesive joining the particles 11.

Fig. 2 shows form 12 merely as a modification in shape without any marked advantage, except that these forms may be readily stacked for various purposes.

Fig. 3, however, shows a rather sharp edged disk 13, shown as round, with a substantial area 14, and a thin edge 15.

Fig. 4 is a rectangular tablet 16, shown as a square, with thin edges 17 and rather sharp corners 18. The edges and the corners aid in inserting it into soil, or it may be merely placed on top of the soil as above described.

Fig. 5 is a strip 19 which may be grooved or marked at intervals 20 to break it up into measured doses. For small plants, one unit may be broken off, and for larger plants, two or more units may be left joined together. This facilitates application and lowers labor costs. The strip form may be made on presses, or be extruded.

Fig. 6 shows a rod 21 of any suitable length which may be moulded or extruded. In use it may be inserted into soil by pressing it in, and breaking it off at a given depth to measure the feeding. It may also be made of limited and definite length with at least one rounded end 22 which acts as a taper to permit it to enter the soil. A more pointed taper like a pencil point is likely to break off.

Fig. 7 is a cross-section of Figure 6, merely to show that the rod is round, but it may be otherwise shaped.

Fig. 8 shows a tubular form 23 with a right section end 24 and a truncated section end 25 forming point 26. Such a form may readily be pushed by the thumb or finger into the soil substantially burying it. The form 23 may be cut from an elongated tube form 28, shown in Fig. 9. This form is preferably extruded. It may be provided in or cut into lengths according to the amount of food required.

Fig. 10 is a shell-form which may be made of two compressed half-shells, as concavo-convex pills 30 and 31, sealed at 32 by adhesive. Before sealing any suitable plant food 33 may be inserted within, such as bulk substance of the same material compressed to form the shells, or different material.

Fig. 11 represents a form 34 which may be moulded without pressure. For example, a plaster mix 35 of slaked lime and water, quite thick, may be used as adhesive for dry or moist granules 36 of the food, and the resulting plastic mass may be filled into moulds, spread flat and cut to tablet size, or otherwise made into any desired shape. The plastic mass is suitable for extruding various forms. As the mass drys it may take up carbon dioxide forming calcium carbonate, setting like ordinary wall plaster. This form is advantageous in providing lime, as an alkali for the soil. The lime will not interfere with the decomposition of the putrescible substance.

The foregoing description merely exemplifies the various forms which may be utilized under this invention, as expressed in the appended claims.

The present application is a continuation in part of my prior application, Serial No. 679,280, filed July 7, 1933.

I claim:

1. A diet for potted plants and the like which consists of granules of fertilizer material united into substantial rigidity into a relatively large flat wafer-like form having a relatively thin edge adapting the form for insertion edgewise into earth about a plant, the fertilizer material consisting of about 9 parts of fish meal to provide nitrogen and phosphate and about 1 part of a potassium salt.

2. A diet for potted plants and the like which consists of granules of fertilizer material united into substantial rigidity into a relatively large flat wafer-like form having a relatively thin edge adapting the form for insertion edgewise into earth about a plant, the fertilizer material consisting of about 1 part of a potassium salt, a fertilizer phosphate-carrier equivalent to about 2.7 parts of bone, and insoluble putrescible organic nitrogenous material in quantity equivalent to about 9 parts of ammonia.

LINUS H. JONES.